United States Patent [19]

Nikitin et al.

[11] 4,402,369

[45] Sep. 6, 1983

[54] PNEUMATIC TOOL

[75] Inventors: Jury F. Nikitin; Dmitry J. Nikitin; Nikolai A. Rykov; Igor L. Terekhov, all of Moscow, U.S.S.R.

[73] Assignee: Moskovskoe Vysshee Technicheskoe Uchilische, Moscow, U.S.S.R.

[21] Appl. No.: 266,935

[22] Filed: May 26, 1981

[51] Int. Cl.$^3$ .......... B23Q 5/00

[52] U.S. Cl. .......... 173/18; 173/30; 173/31; 173/32; 173/36; 173/162 R

[58] Field of Search .......... 91/170 R, 189 R; 92/85 B; 173/18, 30-33, 36, 134, 135, 144, 157, 158, 161, 162 R

[56] References Cited

U.S. PATENT DOCUMENTS

| | | | |
|---|---|---|---|
| 1,452,140 | 4/1923 | Bayles | 173/36 |
| 1,917,335 | 7/1933 | Smith et al. | 173/161 |
| 3,106,134 | 10/1963 | Osborne | 91/189 R |
| 3,866,690 | 2/1975 | Lance et al. | 91/189 R |

FOREIGN PATENT DOCUMENTS

| | | | |
|---|---|---|---|
| 804653 | 10/1936 | France | 173/162 R |
| 194444 | 3/1923 | United Kingdom | 173/18 |

*Primary Examiner*—Harold D. Whitehead
*Assistant Examiner*—K. Bradford Adolphson
*Attorney, Agent, or Firm*—Myron Greenspan; Burton L. Lilling; Bruce E. Lilling

[57] ABSTRACT

A percussive-action pneumatic tool comprising a handle-carrying frame having successively accommodated therein a shock-absorber and a housing with the percussion mechanism therein, connected through a gas distribution system to a compressed air source. The frame has a length sufficient for abutting against the surface of a material being worked and has a guide which receives the housing with the percussion mechanism. The shock-absorber includes a receptacle mounted on the frame and communicating via a controllable valve alternatively with the compressed air source and the atmosphere, a rod being mounted in this receptacle, adapted to act upon the housing with the percussion mechanism, to move the housing relatively to the frame as compressed air is supplied into the receptacle.

8 Claims, 4 Drawing Figures

PNEUMATIC TOOL

The present invention relates to percussive-action pneumatic tools.

The pneumatic tool according to the present invention can be most effectively used as a pneumatic jack hammer for breaking up rock, concrete, road pavements, etc.

The disclosed pneumatic tool can also be employed as a pneumatic hand-held drill for drilling relatively shallow holes in a material being worked.

There are widely known portable pneumatic hammers or jack hammers comprising a handle-carrying frame having successively mounted therein a shock-absorber and a percussion mechanism adapted to act upon the surface of a material being worked and connected through a gas distribution system to a source of compressed gas. The percussion mechanism includes a piston and a striker coaxially mounted in the housing. The frame is in the form of a closed-end sleeve received about the end of said housing. The shock-absorber includes a cylindrical spring received between the bottom of the closed end of the sleeve and the face end of the housing.

In the above described portable pneumatic hammers, the vibration caused by the operation of the percussion mechanism is transmitted through the spring, the sleeve and the handle to the hands of the operator. Within a relatively short period this vibration causes fatique of the operator, while prolonged work with a hammer of this type eventually causes a grave ailment sometimes called the vibrodisease, rendering a person unfit for physical work. Furthermore, when working with a hammer of this type, the operator has to endure a relatively great physical load, having as he does to overcome the alternating effort caused by the operation of the percussion mechanism, and also having to apply himself a considerably effort to the handle, to press the pneumatic hammer against the surface of the material being worked, so as to ensure its proper performance. This considerable physical effort is another source of fatigue and brings down the labour productivity.

There are further known mobile units incorporating a pneumatic tool, comprising a frame supported on castor wheels and carrying a handle, the frame having successively mounted therein a shock-absorber and a percussion mechanism adapted to act upon the surface of a material being worked and connected through a gas distribution system to a source of compressed gas. The frame accommodates two cylinders extending parallel with each other and interconnected with a bridging member carrying the handle, the housing with the percussion mechanism being accommodated intermediate the cylinders. The housing is supported by slide members received in the internal spaces of the cylinders, the shock absorbers in the form of long cylindrical coiled springs being compressed between the slides and the bridging member. Received in the cylinders under the slides are pistons adapted to raise the housing with the percussion mechanism into the initial position, following the penetration of the pneumatic tool into the material being worked to a predetermined depth.

However, the last-described units are heavy, bulky and manueverable with a difficulty, to say nothing of their being capable of acting upon the surface of the material being worked strictly in a vertical direction, which curbs down considerably the range of their possible applications. Furthermore, in such mobile units the vibration caused by the operation of the percussion mechanism is also transmitted, although in a lesser degree, to the operator's hands through the frame and the handle, which increases operator's fatigue and affects the labour productivity.

It is an object of the present invention to create a portable percussive-action pneumatic tool wherein the frame and the shock-absorber should be constructed so as to substantially reduce the vibration transmitted to the operator's hands in operation of the percussion mechanism.

It is another object of the present invention to relieve the physical load of the operator, caused by the necessity of pressing the pneumatic tool against the surface of the material being worked, to overcome the alternating effort produced by the operation of the percussion mechanism.

These and other objects are attained in a percussive-action pneumatic tool comprising a handle-carrying frame having successively accommodated therein a shock-absorber and a housing receiving a percussion mechanism connected through a gas distribution system to a compressed air source, in which penumatic tool, in accordance with the invention, the frame has a length sufficient for abutting against the surface of a material being worked, the frame having a guide receiving the housing with the percussion mechanism, the shock-absorber including a receptacle mounted on the frame, connectable through a controlled valve to a compressed-air source and to the atmosphere, and a rod received in this receptable, adapted to actuate the housing with the percussion mechanism along the guide relative to the frame, as compressed air is fed into the receptacle.

It is expedient that the end wall of the housing of the percussion mechanism should have made therein a duct of the gas distribution system, for connection of the latter to the compressed air source, the duct having mounted therein a cut-off valve aligned coaxially with the rod of the shock-absorber, for the rod to be adapted to control the opening and closing of this valve.

This allows for automatic engagement of the percussion mechanism as the shock-absorber is engaged manually, and thus to facilitate the operating of the pneumatic tool.

It is also expedient that the guide receiving the housing of the percussion mechanism should be shaped as an annulus encompassing the housing and having in the inner wall thereof a recess adapted to be filled with a lubricant.

This enables to simplify the structure of the guide and to avoid dry friction between the guide and the housing, and thus to reduce additionally the vibration transmitted to the operator's hands in operation of the percussion mechanism, and also to reduce additionally the physical burden of the operator, caused by the necessity of urging the pneumatic tool to the surface of the material being worked.

It is still further expedient that the end of the frame, adapted to abut against the surface of the material being worked, should have a footplate mounted on the external side thereof.

This enables the operator to urge the pneumatic tool to the surface of the material being worked by his foot, using the weight of his body, and thus to reduce additionally the physical effort required for pressing the pneumatic tool to the surface of the material being worked.

It is expedient that the surface of the footplate, adapted to engage the surface of the material being worked, should have a resilient coating.

This enables to reduce still further the vibration transmitted to the operator through the material being worked in operation of the percussion mechanism.

It may be expedient that the end of the frame, adapted to abut against the surface of the material being worked, should be L-shaped and carry an abutment arranged coaxially with the percussion mechanism, to receive therebetween the material being worked.

This enables to apply the pneumatic tool to an article made of a material being worked in any position in space and to hold the pneumatic tool but slightly in the course of its operation, whereby operating the tool is significantly facilitated.

It is expedient that the said abutment should be pivotally mounted on the L-shaped end of the frame.

This enables to set the percussion mechanism at a required angle to the surface of the material being worked, and thus to enhance the reliability of the positioning of the pneumatic tool at the article made of the material being worked.

It is further expedient that the surface of the abutment, adapted to engage the surface of the material being worked, should have a resilient coating made of a material having a relatively great coefficient of friction.

This enables to increase the friction between the abutment and the surface of the material being worked, to avoid the abutment slipping off the surface of the material being worked and thus to enhance the reliability of setting the pneumatic tool at the article made of the material being worked.

A pneumatic tool constructed in accordance with the present invention enables to practically eliminate the transmission of vibrations to the operator's hands in operation of the percussion mechanism, and to significantly relieve the physical burden of the operator, caused by the necessity of urging the pneumatic tool against the surface of the material being worked.

The disclosed pneumatic tool is structurally simple, its manufacture is facilitated, same as its operation; it can be made of relatively small dimensions and weight, readily portable and positionable to suit the job to be performed.

Given hereinbelow is a description of embodiments of the present invention, with reference being made to the accompanying drawings, wherein.

The description is that of preferred embodiments of the invention, with the accompanying drawings being schematical and not showing details related to the production technology of the pneumatic tool.

Figure 1:
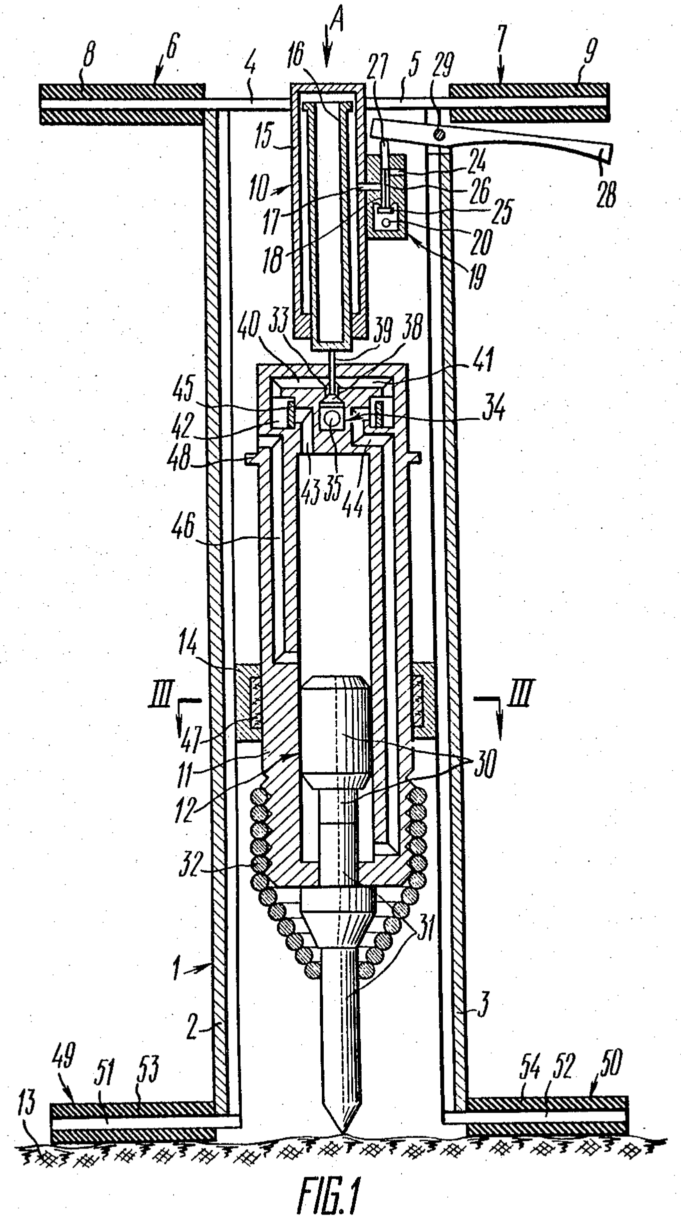
FIG. 1 is a longitudinal sectional view of a pneumatic tool constructed in accordance with the present invention, with the frame of the tool provided with footplates.
Figure 2:
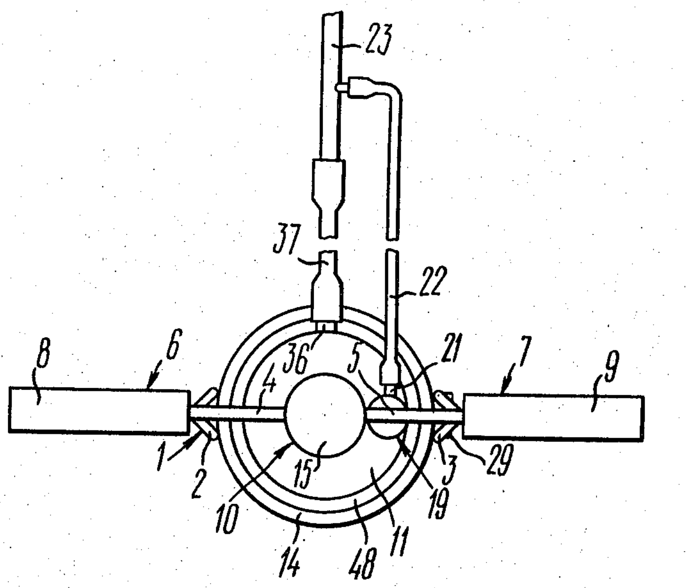
FIG. 2 is a view taken along arrow line A in FIG. 1.

The pneumatic tool comprises a frame 1 (FIG. 1) including two longitudinal posts 2, 3 and transverse bars 4, 5, fast with one another. The extremities of the transverse bars 4, 5, projecting beyond the longitudinal posts 2, 3 serve as respective handles 6, 7 with elastic covers or coatings 8, 9 which in the presently described embodiments are rubber sleeves received about the extremities of the respective bars 4, 5. The frame 1 has successively mounted therein a shock-absorber 10 (FIGS. 1 and 2) and a housing 11 with percussion mechanism 12 (FIG. 1). The frame 1 has a length sufficient for abutting against the surface of a material 13 being worked. The frame 1 has mounted thereon a guide 14 receiving the housing 11.

The shock-aborber 10 includes a receptacle 15 in the form of a thin-wall cylinder secured to the inner end portions of the bars 4, 5. The end wall of the receptacle 15 has made therein a bore through which a rod 16 extends, the rod 16 being in the form of a thin-wall closed-end sleeve of which the open end is received inside the receptacle 15, while its closed end extends outside the receptacle 15. The latter is connectable through ducts 17, 18 of a control valve 19, the duct 20 of an air connection 21 (FIG. 2), a rubber hose 22 and the main compressed air line 23 to a compressed air source (not shown); it is also made to communicate with ambient air through the duct 24 of the control valve 19. The control valve 19 has a valve member 25 (FIG. 1) for selectively closing the duct 18, connected with aid of a stem 26 and a slide valve member 27 received in the duct 18 and adapted to be actuated by a control arm 28. The arm 28 controlling the valve 19 is provided directly under the handle 7 and is pivotally mounted on a pivot pin 29 mounted on the post 3 of the frame 1.

Figure 3:
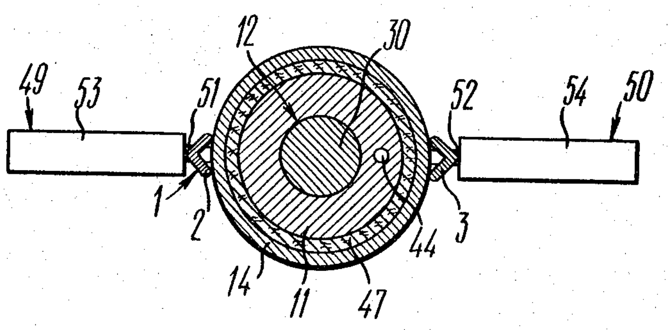
FIG. 3 is a sectional view along line III—III of FIG. 1.

The percussion mechanism 12 (FIGS. 1 and 3) includes a piston 30 accommodated in the internal space of the housing 11 and a striker 31 (FIG. 1) coaxial with the housing 11, the striker 31 extending through a corresponding bore in the respective end of the housing 11, with one end portion of the striker 31 being accommodated within the housing 11, and its other end portion being adapted to strike the surface of the material 13 being worked. Received about the end portion of the housing 11 and about the striker 31 is an extension spring 32 for pulling the striker 31 from the material 13 being worked upon termination of the operation of the pneumatic tool, and for retaining the striker 31 in the bore of the housing 11 when the pneumatic tool is handled in an idle state. To actuate the piston 30, a gas distribution system is provided in the walls of the housing 11, including a duct 33 in the end wall of the housing 11, connectable through a control valve 34, the duct 35 of a connection 36 (FIG. 2), a rubber hose 37 and the main compressed air line 23 to the source (not shown) of compressed air. The duct 33 (FIG. 1) is closeable by the valve member 38 of the control valve 34, arranged coaxially with the rod 16, to be controlled thereby, for which purpose this valve member 38 of the control valve 34 is connected to the rod 16 of the shock-absorber 10 by a stem 39. Also provided in the end wall of the housing 11 are ducts 40, 41 connecting the duct 33 with an annular space 42 connectable via a duct 43 with the above-piston space of the housing 11, and via a duct 44 with the under-piston space thereof. Received in the annular space 42 is a radially movable ring 45 which can be displaced to alternatively close off the ducts 43 and 44. A duct 46 is provided in the side wall of the housing to selectively connect the above piston and under-piston spaces of the housing 11 with ambient air or the atmosphere.

The guide 14 receiving the housing 11 is in the form of an annulus enclosing the housing 11 and having an annular recess 47 in the inner wall thereof, adapted to be filled with a lubricant.

A shoulder 48 (FIGS. 1, 2) of an annular shape is provided on the housing 11 below (in the drawing, FIG. 1) the outlet of the duct 46, to limit the axial travel of the housing 11 as the striker 31 penetrates the material 13 being worked, and also to retain the housing 11 in the guide 14 when the pneumatic tool is handled in an idle state.

Mounted externally of the frame 1 on thc end portions of the respective posts 2, 3 are footplates 49, 50 onto which the operator is expected to step, and which are also adapted to engage the surface of the material 13 being worked, the footplates 49, 50 being in the form of respective bars 51, 52 with resilient covers or coatings 53, 54 which in the presently described embodiments are in the form of rubber tubes received about the respective bars 51, 52.

Figure 4:
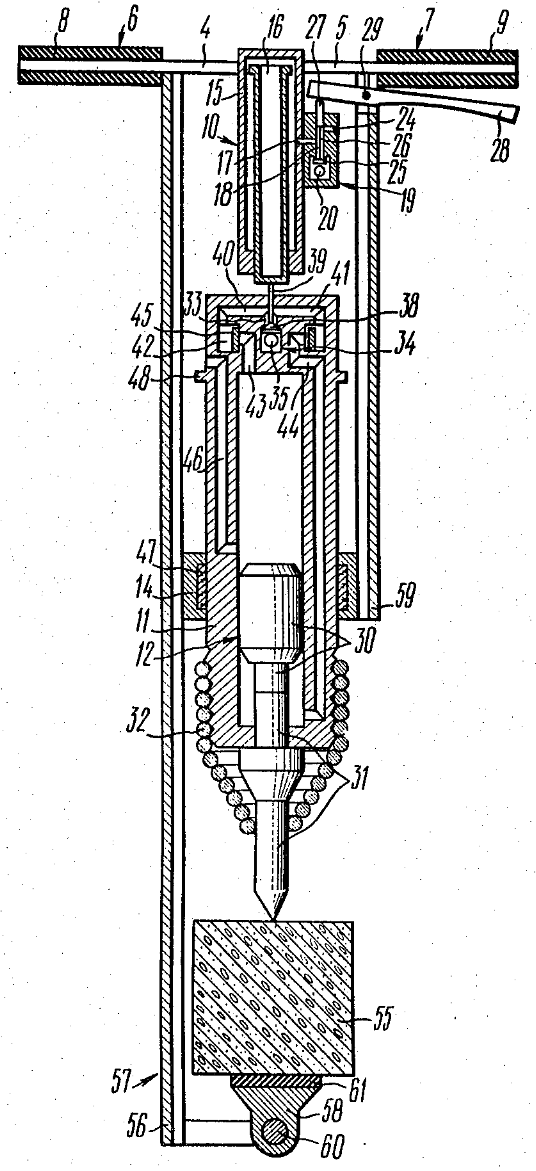
FIG. 4 is a longitudinal sectional view of a pneumatic tool constructed in accordance with the present invention, with the frame of the tool having an L-shaped end portion and a pivotally mounted abutment.

When a pneumatic tool constructed in accordance with the invention is intended for jobs such as cutting-off the head of a pile 55 (FIG. 4) driven into the soil as a basis of the foundation of a multi story building, it is expedient that the end portion of one post 56 of the frame 57 should be L-shaped and carry an abutment 58, whereas the end portion of the other post 59 of the frame 57 should extend merely as far as the guide annulus 14. The abutment 58 is pivotally mounted with aid of a pivot pin 60 carried by the L-shaped end portion of the post 56 of the frame 57 and has a rubber coating 61 on its surface adapted to engage the pile 55. In this embodiment of the pneumatic tool in accordance with the invention, the rest of the elements of the construction are similar to those described hereinabove in connection with FIGS. 1, 2 and 3 and are indicated in FIG. 4 with the same numerals.

The disclosed pneumatic tool operates, as follows.

The operator places the pneumatic tool in a required position onto the surface of the material 13 to be worked, resting his hands on the handles 6, 7 and putting one of his feet onto either one of the footplates 49, 50 whereafter he grips the arm 28 with his respectivwe hand and turns it upwardly as far as it will go.

The arm 28 thus pushes the slide valves 27 deeper into the duct 18 and displaces the valve member 25 through the stem 26, whereby the duct 18 becomes open, and the internal space of the receptacle 15 communicates via the ducts 17, 18, the duct 20 of the connection 21, the rubber hose 22 and the main compressed air line 23 and the source (not shown) of compressed air. Consequently, compressed air is fed into the internal space of the receptacle 15, so that the pressure of the air therein is built up to the pressure in the compressed air line 23, whereby the differential of the pressure drops across the rod 16 and across the valve member 38 drives the rod 16 outwardly of the receptacle 15 into abutment with the respective end face of the housing 11, with the valve member 38 being displaced through the stem 39.

Consequently, the valve member 38 opens the duct 33, whereby the gas distribution system communicates via the duct 35 of the connection 36, the rubber hose 37 and the compressed air line 23 with the source (not shown) of compressed air. In the initial position, the ring 45 is made to close off the inlet of the duct 43 and to clear the inlet of the duct 44. Compressed air flows via the ducts 33, 40 and 41 into the annular space 42, wherefrom it flows via the duct 44 into the under-piston space of the housing 11, wherein the air pressure is thus built-up, so that the pressure drop across the piston 30 drives the latter upwardly (in the drawings), and the first cycle of the operation of the pneumatic tool is initiated.

Upon the piston 30 having passed the outlet of the duct 46 into the internal space of the housing 11, the latter's above-piston space becomes cut off from the duct 46, whereas its under-piston space communicates with this duct 46. Compressed air is bled from the under-piston space of the housing 11 via this duct 46 into the atmosphere, whereby the air pressure in this space drops, while the air pressure in the above-piston space of the housing 11 somewhat rises owing to the continuing upward motion of the piston 30.

Under the action of the pressure drop upon the ring 45, the latter is displaced radially to close off the duct 44 and to open the duct 43. Compressed air flows from the annular space 42 via the duct 43 into the above piston space of the housing 11, whereby the air pressure therein is built up, and the pressure drop across the piston 30 drives the latter down (in the drawing).

Upon the piston 30 having passed in its downward stroke the outlet of the duct 46 into the internal space of the housing 11, the latter's under-piston space becomes disconnected from this duct 46, while its above-piston space communicates with this duct 46. Compressed air exits from the above-piston space of the housing 11 via the duct 46 into the atmosphere, whereby the pressure in this space drops, while the pressure in the under-piston space of the housing 11 somewhat rises owing to the continuing downward motion of the piston 30.

The downward stroke of the piston 30 terminates in its elastic impact against the end of the striker 31 extending into the internal space of the housing 11, whereby the opposite end of the striker 31 strikes the surface of the material 13 being worked.

The pressure drop across the ring 45 displaces the latter radially to close off the duct 43 and to open the duct 44. Consequently, compressed air flows from the annular space 42 via the duct 44 into the under-piston space of the housing 11, whereby the pressure in the last-mentioned space is built up, and the pressure drop across the piston 30 drives the latter upwardly once again, and the second operating cycle of the pneumatic tool is thus commenced.

The subsequent operation of the pneumatic tool is a successive repetition of the abovedescribed cycle including the reciprocation of the piston 30 and its elastic impact against the striker 31; with every new cycle the striker 31 breaks the material 13 being worked somewhat more, whereby it penetrates the material 13, while the housing 11 with the percussion mechanism 12 likewise gradually slides downward in the guide 14, longitudinally of the frame 1, under the urging action exerted thereupon by the rod 16 of the shock-absorber 10, so that there is ensured the degree of urging the housing 11 with the percussion mechanism 12 against the surface of the material 13 being worked, essential for proper performance of the pneumatic tool.

In operation of the pneumatic tool, its housing 11 is acted upon by forces brought about by the alterations of the air pressure in the above-piston and under-piston spaces thereof, and also by the impacts between the housing 11 and the striker 31. Under the action of these forces the housing 11, same as the piston 30, is driven through cyclic reciprocation damped by the permanent effort of the rod 16 of the shock-absorber 10, abutting against the end face of the housing 11, which provides for maintaining normal performance of the pneumatic tool and inhibits transmission to the frame 1 of the alternating effort and vibration caused by the operation of the percussion mechanism. This damping of the cyclic reciprocation of the housing 11 by the shock-absorber 10 reduces the amplitude of the oscillation of the housing 11 to a relatively low value and precludes the eventuality of the piston 30 striking the housing 11, which enhances the performance of the pneumatic tool. With the housing 11 thus cyclically reciprocating, the pressure of air in the internal space of the receptacle 15 of the shock-absorber 10 remains essentially constant, since this space continuously communicates with the source (not shown) of compressed air, whereby the alternating effort and vibration caused by the operation of the percussion mechanism 12 would not be transmitted from the housing 11 through the shock-abosrber 10 to the frame 1, while dry friction between the housing 11 and the guide 14 is precluded owing to the annular recess 47 in the inner wall of the guide 14 being filled with a lubricant, whereby the alternating effort and vibration caused by the operation of the percussion mechanism would neither be transmitted from the housing 11 to the frame 1 through the guide 14.

The operation of the pneumatic tool can be terminated, as follows. The operator releases the arm 28, whereby the latter releases the slide valve 27, so that the slide valve 27 and the valve member 25, interconnected by the stem 26, are driven upwardly in the duct 18 under the action of the pressure drop across the valve member 25. This motion results in the released slide valve 27 turning the arm 28, and in the ducts 18 and 24 communicating to connect the internal space of the receptacle 15 to atmosphere via the ducts 17, 18 and 24, while the valve member 25 closes off the duct 18 to disconnect the internal space of the receptacle 15 from the source (not shown) of compressed air. Compressed air is thus bled from the internal space of the receptacle 15 into the atmosphere, so that the air pressure in the last-mentioned space drops, and the differential of the pressure drops across, respectively, the rod 16 and the valve member 38 drives the rod 16 into the receptacle 15 by the effort transmitted from the valve member 38 via the stem 39; the valve member 38 closing off meanwhile the duct 33 and disconnecting the gas distribution system from the source (not shown) of compressed air.

When a pneumatic tool constructed in accordance with the present invention is intended for jobs such as cutting off the head of a pile 55 driven into soil, it is expedient, as it has been already mentioned, to have the pneumatic tool in a modification where the abutment 58 is provided on the L-shaped end portion of the post 56 of the frame 57. In this case the operator positions the pneumatic tool horizontally with respect of the earth surface, perpendicularly to the pile 55, so that the rubber coating 61 of the abutment 58 engages the side of the pile 55, opposite to that to be worked. This done, the operator pulls the pneumatic tool by the handles 6, 7 toward himself, away fron the pile 55, grips the arm 28 and turns it toward the handle 7 as far as it will go. The subsequent operation of the pneumatic tool having the abutment 58 on the L-shaped end portion of the post 56 of the frame 57 is identical with the abovedescribed operation of the pneumatic tool with the footplates 49, 50 on the ends of the posts 2, 3 of the frame 1.

With the frame 1 being of a length sufficient for abutting against the surface of the material 13 being worked, it has become possible to dedicate the whole operator's effort of pressing down the pneumatic tool to the reaction of the material 13 being worked, having a permanent value. With this structure of the frame 1, there has been eliminated the necessity of heavily leaning against the housing 11 with the percussion mechanism 12 producing the alternating effort and vibration in its operation, while ensuring the degree of immobility of the pneumatic tool on the surface of the material 13 being worked, essential for proper performance of the tool, with a relatively small and permanent urging-down effort. Thus, the transmission to the operator of the vibration caused by the operation of the percussion mechanism 12 has been significantly inhibited, and the operator's effort required for urging the pneumatic tool against the surface of the material 13 being worked has been considerably reduced.

With the shock-absorber 10 including the receptacle 15 supported by the frame 1 and communicating with the source (not shown) of compressed air, and the rod 16 extending through the bore in the receptacle 15 and being operatively connected with the face end of the housing 11, it is possible to dampen effectively the alternating effort and the vibration caused by the operation of the percussive mechanism 12 by the permanent effort applied to the rod 16 by the permanent pressure of the gas in the internal space of the receptacle 15, equalling the pressure in the compressed air supply line. With the shock absorber 10 being of this structure providing for a permanent external effort, unlike widely known cylindrical springs and other known devices creating a linearly variable external effort, the effort transmitted by the shock-absorber 10 to the frame 1, which has to be compensated for by the operator's effort of urging the pneumatic tool against the surface of the material 13 being worked, is likewise permanent. This has enabled to reduce considerably the transmission to the operator's hands of the vibration caused by the operation of the percussion mechanism 12, as well as to relieve the physical effort of the operator, required for urging the pneumatic tool to the surface of the material 13 being worked. Furthermore, this has provided for gradual feed of the housing 11 with the percussion mechanism 12 in the guide 14 longitudinally of the frame 1 under the urge exerted by the rod 16 of the shock-absorber 10, as the striker 31 penetrates the material 13 being worked, which, in its turn, provides for proper performance of the pneumatic tool.

With the duct 33 made in the end wall of the housing 11 and the valve 34 adapted to close off this duct arranged coaxially with the rod 16 on the stem 39 connected with this rod 16, the latter has been made capable of closing and opening this valve 34 controlling the feed of compressed air into the gas distribution system of the percussion mechanism, following the manual closing and opening of the valve 19 controlling the feed of compressed air into the shock-absorber 10. This has provided for automatic engagement of the percussion mechanism 12 upon manual turning-on of the shock-absorber 10, which facilitates operating the pneumatic tool.

The provision in the inner wall of the guide 14 of the recess 47 fillable with a lubricant has enabled to avoid dry friction between the guide 14 and the housing 11, which additionally reduces the transmission to the operator's hands of the vibration caused by the operation of the percussion mechanism 12, and also relieves still further the physical effort of the operator required for urging the pneumatic tool to the surface of the material 13 being worked.

The provision of the footplates 49, 50 externally of the frame 1, on the end portions of the posts 2, 3 enables the operator to urge the pneumatic tool to the surface of the material 13 being worked, using his foot and the weight of his body, and, therefore, relieves the physical effort required for urging the pneumatic tool to the surface of the material 13 being worked.

The provision of the surfaces of the footplates 49, 50, engaging the surface of the material 13 being worked, with resilient covers or coatings 53, 54 enables to reduce still more the transmission to the operator's hands of the vibration caused by the operation of the percussion mechanism 12 through the material 13 being worked.

With the end portion of the post 56 of the frame 57 in a modification of the proposed pneumatic tool being L-shaped and carrying the abutment 58, the tool can be set at an article of the material being worked, e.g. at the head end of a pile 55 driven into soil as a part of the foundation of a multi story building, at any position in space, and also it is possible to hold the pneumatic tool but slightly in the course of its operation which latter is thus significantly facilitated.

With the abutment 58 being pivotally mounted on the L-shaped end portion of the post 56 of the frame 57 with aid of the pivot pin 60, the percussion mechanism 12 can be set at a required angle with respect to the material being worked, e.g. to the surface of the pile 55, and the reliability of positioning the tool at this surface is enhanced.

With the surface of the abutment 58, engaging the surface of the material being worked, e.g. the surface of the pile 55, being provided with the resilient coating 61 of a material with a relatively high coefficient of friction, e.g. rubber, the friction between the abutment 58 and the pile 55 is increased, the possibility of the abutment 58 slipping off the pile 55 is avoided, and the reliability of positioning the pneumatic tool at the article being worked is enhanced.

What is claimed is:

1. A percussive-action pneumatic tool comprising: a frame having a length sufficient for the frame to abut against the surface of a material being worked; handle means mounted on said frame; a source of compressed air; a receptable mounted on said frame, alternatively connectable with said source of compressed air and the ambient atmosphere; means for alternatively connecting said receptacle with said compressed air source and the atmosphere; a rod received in said receptable so that one end thereof extends beyond said receptacle; a percussion mechanism arranged coaxially with said rod; a housing accommodating said percussion mechanism, mounted in said frame for displacement longitudinally thereof; a guide for said housing, mounted on said frame; said one end of said rod, extending beyond said receptacle, being adapted to actuate said housing as compressed air is fed into said receptacle, for displacing said housing with said percussion mechanism longitudinally of said frame; a gas distribution system for alternatingly supplying compressed air to said percussion mechanism and directing compressed air therefrom into the atmosphere.

2. A pneumatic tool as set forth in claim 1, wherein the end wall of said housing of said percussion mechanism has made therein a duct of said gas distribution system, for connecting the latter to said source of compressed air, said duct accommodating therein a valve adapted to close off said duct, arranged coaxially with said rod of the receptacle, for said rod to control the opening and closing of said valve.

3. A pneumatic tool as set forth in claim 1, wherein said guide for said housing of said percussion mechanism is in the form of an annulus encompassing said housing and having in the inner wall thereof a recess adapted to be filled with a lubricant.

4. A pneumatic tool as set forth in claim 1, wherein the end portion of said frame, adapted to abut against the surface of the material being worked, has a footplate mounted externally thereof.

5. A pneumatic tool as set forth in claim 4, wherein the surface of said footplate, adapted to engage the surface of the material being worked, has a resilient coating.

6. A pneumatic tool as set forth in claim 1, wherein the end portion of said frame, adapted to abut against the surface of the material being worked, is L-shaped and carries an abutment arranged coaxially with said percussion mechanism, for receiving the material being worked therebetween.

7. A pneumatic tool as set forth in claim 6, wherein said abutment is pivotally mounted on the L-shaped end portion of said frame.

8. A pneumatic tool as set forth in claim 6, wherein the surface of said abutment, adapted to engage the surface of the material being worked, has a resilient coating made of a material with a relatively great coefficient of friction.

* * * * *